Sept. 20, 1971     R. H. GILBERT     3,605,935

AIR SURFACE RAPID TRANSIT VEHICLE

Filed Jan. 6, 1970     4 Sheets-Sheet 1

INVENTOR
RICHARD H. GILBERT
BY Herbert E. Kidder
AGENT

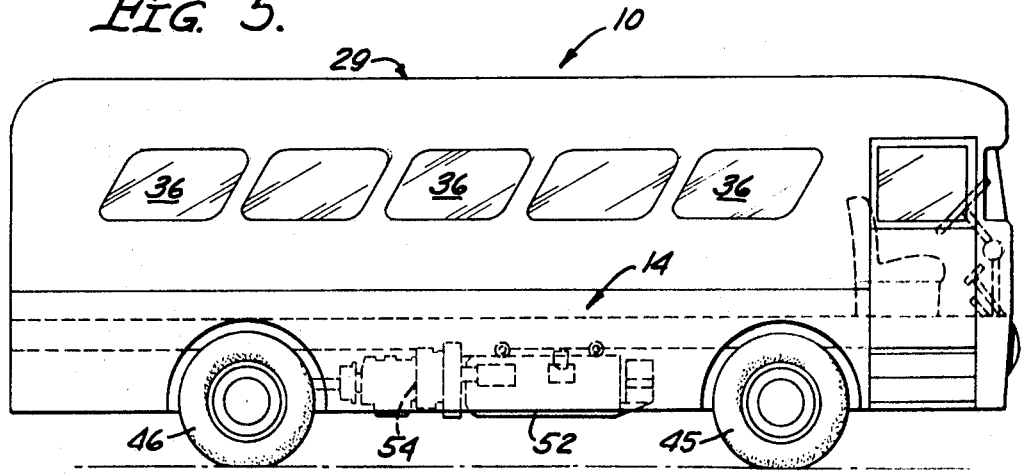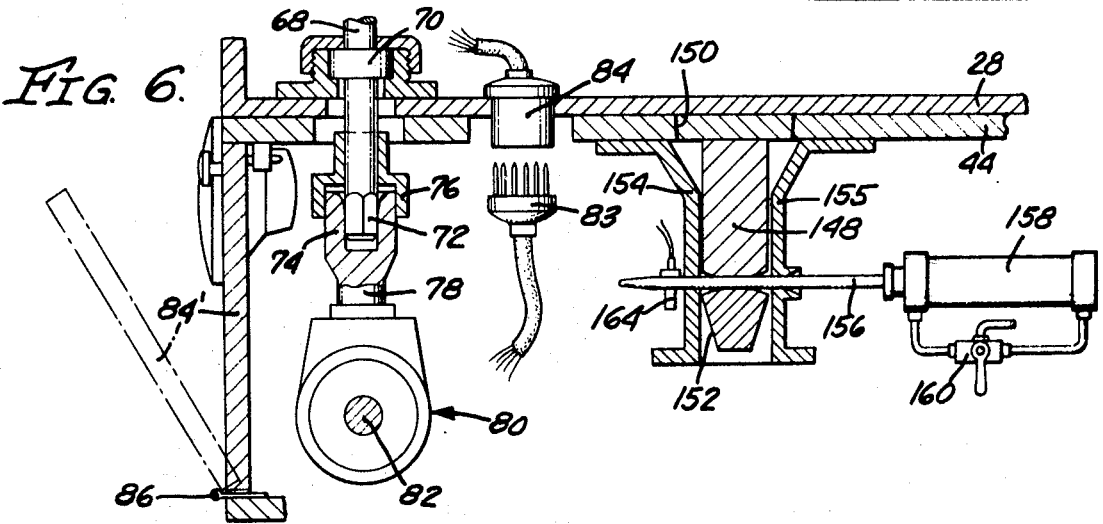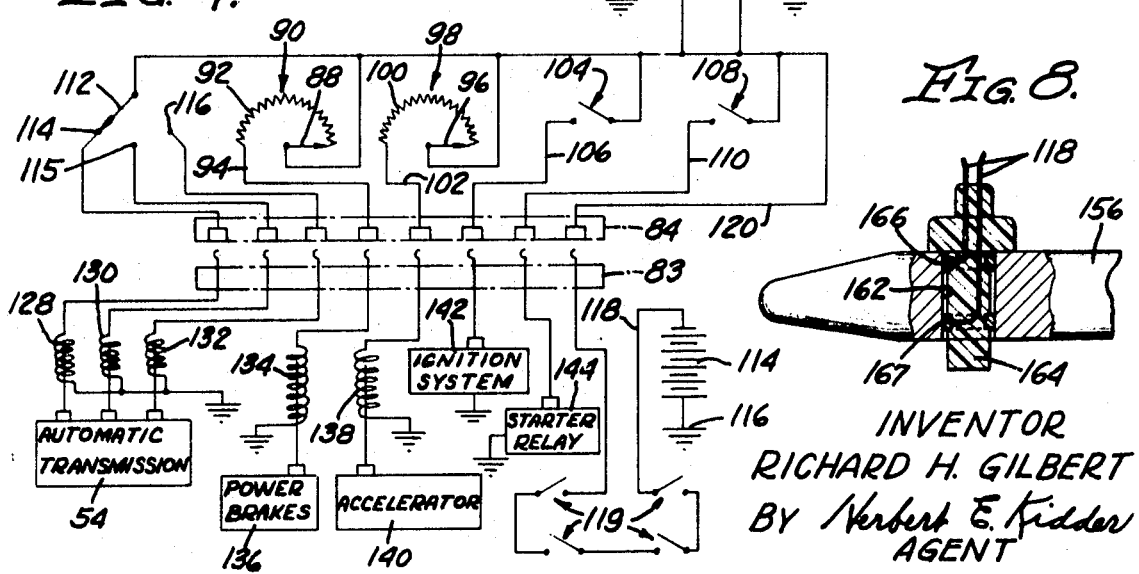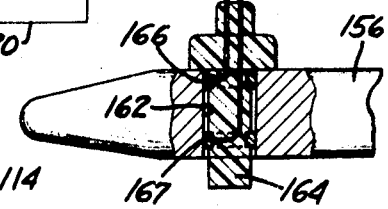

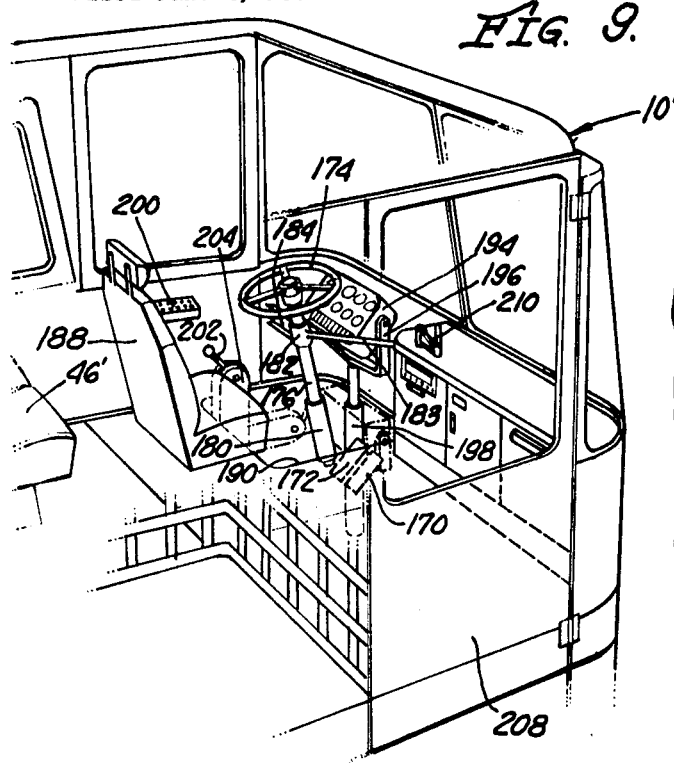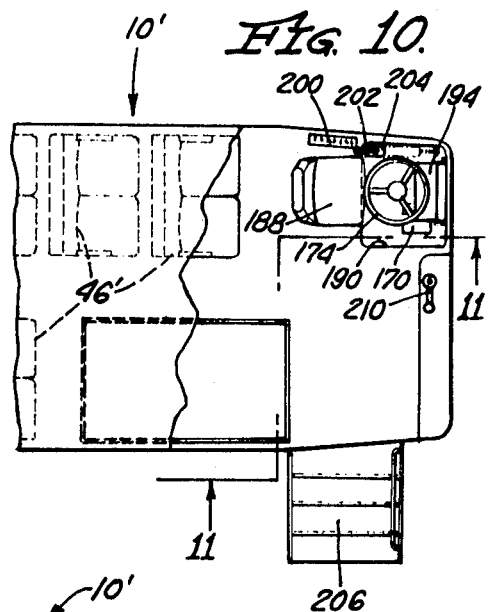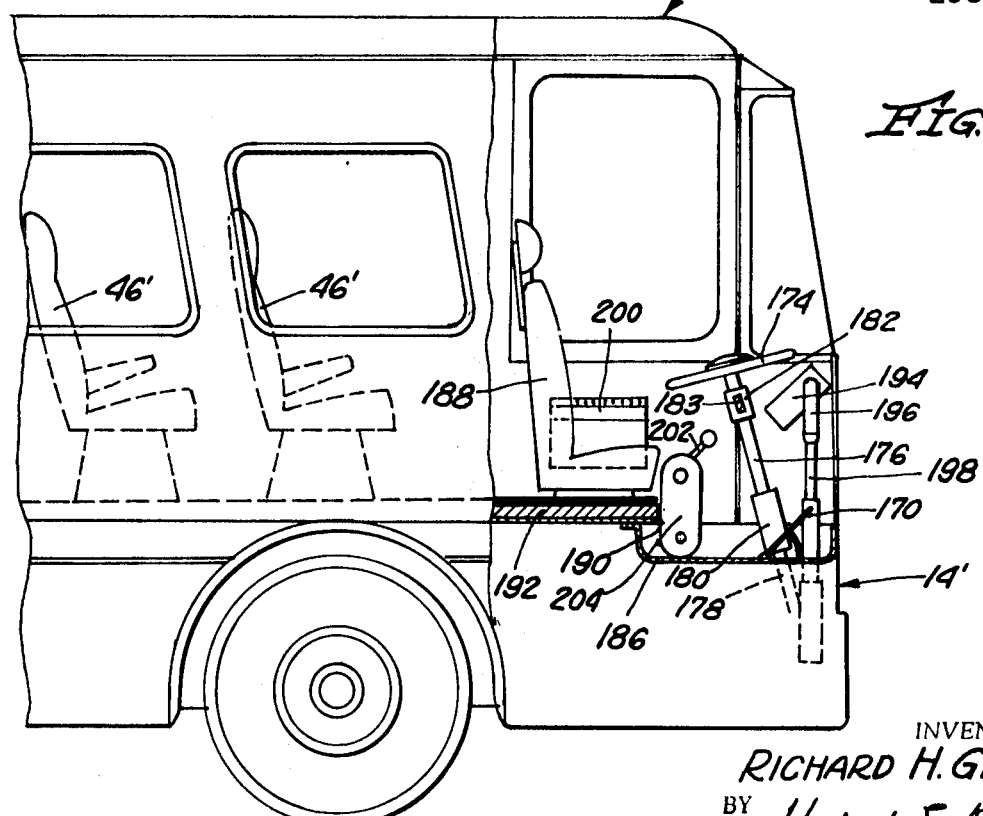

INVENTOR
RICHARD H. GILBERT
BY Herbert E. Kidder
AGENT

United States Patent Office 3,605,935
Patented Sept. 20, 1971

3,605,935
AIR SURFACE RAPID TRANSIT VEHICLE
Richard H. Gilbert, P.O. Box 4206,
Riverside, Calif. 92504
Continuation-in-part of abandoned application Ser. No. 756,716, Aug. 8, 1968, which is a continuation-in-part of abandoned application Ser. No. 609,467, Jan. 16, 1967. This application Jan. 6, 1970, Ser. No. 913
Int. Cl. B60k *35/00;* B64c *37/02;* B64d *9/00*
U.S. Cl. 180—89
14 Claims

ABSTRACT OF THE DISCLOSURE

A passenger- or cargo-carrying pod is detachably connected to a helicopter for high-speed transport thereby between metropolitan and suburban depots, and is then transferred to and locked onto a self-propelled power unit of one type or another, for transport on the ground. In one case, the power unit comprises an automotive-type chassis having wheels that run on the street or highway. The chassis has a self-contained power plant and transmission for driving the wheels, as well as steering mechanism, brakes, lights, etc., which are operated by controls within the pod. In another case, the power unit comprises a chassis having wheels that run on one or more tracks, such as a monorail. When mounted on either of the power units, the pod can be transported over a fixed route within the city to pick up and discharge passengers or cargo.

CROSS-REFERENCE TO RELATED APPLICATIONS

This application is a continuation-in-part of my copending application Ser. No. 756,716, filed Aug. 8, 1968, now abandoned, which in turn was a continuation-in-part of application Ser. No. 609,467, filed Jan. 16, 1967, now abandoned.

BACKGROUND OF THE INVENTION

This invention pertains to a new and improved system of rapid transit, particularly for transporting passengers over relatively long distances, such as between metropolitan and suburban centers, or between cities that are spaced far enough apart to constitute a relatively long-distance trip by bus, but not quite far enough apart to justify airplane travel.

As metropolitan areas spread out, and suburban areas move farther away from their centers, highway congestion becomes increasingly more of a problem, and bus travel during the rush hours is slowed down to the point where it ceases to be an attractive form of transportation. At the same time, the proliferation of automobiles, most of which carry only one or two passengers, produces more and more air pollution, which is rapidly approaching a critical stage.

The present invention contemplates a system of rapid transit, wherein passengers may be picked up by a motor-driven wheeled vehicle, such as a bus or monorail (or other vehicle running on tracks) which is driven around a predetermined route and then taken to an airport or helicopter port, where the passenger-carrying pod is detached from its wheeled vehicle and detachably connected to the underside of a helicopter, or other VTOL aircraft. The pod is then carried at high speed by the helicopter from the suburban area to the metropolitan center, above the traffic congestion of surface highways. At the metropolitan center depot, the helicopter lands, and in one aspect of the invention, transfers its passenger-carrying pod onto a waiting automotive-type wheeled chassis. When the passenger-carrying pod is thus mounted on the chassis, driving controls inside the pod are connected to their respective operating mechanisms on the chassis, and these are manipulated by the operator, who drives the vehicle away, to make the circuit of the predetermined bus route, delivering the incoming passengers and picking up other passengers for the return trip. Since the passenger pod would carry up to 40 (or more) passengers on each trip, this would eliminate from 30 to 40 passenger cars from the highways, with a corresponding reduction of highway congestion, air pollution, and parking problems.

In another aspect of the invention, the pod is transferred to a power-driven chassis having wheels that run on tracks. Preferably, the chassis in this case is of the type that runs on an overhead monorail, and attachment of the pod to the monorail chassis is essentially the same as the method of attaching the pod to the helicopter. The operation of the monorail car may be controlled either by the operator from his station within the pod, in which case the controls would be operatively connected to their corresponding mechanisms on the monorail chassis, or by a separate monorail operator riding in a cab at the front end of the chassis. The monorail mode of operation is particularly attractive for areas of extreme traffic congestion, as in the downtown district or in the approaches to some of the larger municipal airports, where bus operation is sometimes slowed down excessively at certain times of the day. The monorail might also be used for the same type of interurban service as the helicopter or VTOL aircraft, in which case the passenger-carrying pod would convert from the bus mode to the monorail mode of operation.

The invention makes it possible to transport passengers efficiently by helicopter or other VTOL aircraft, since the passenger-carrying pod can be made extremely lightweight, and the heavy deadweight of the wheeled chassis, power plant, transmission, batteries, etc., is left behind on the ground. The same attendant would remain in the pod with the passengers at all times, both while the pod is being transported by the helicopter, and while it is traveling on the ground. In the latter case, the attendant is the driver of the bus.

SUMMARY OF THE INVENTION

The primary object of the invention is to provide a new and improved system of rapid transit, embodying a novel combination of VTOL aircraft, self-powered wheeled chassis for operation on the ground or on a track, and a passenger-carrying pod that can be detachably mounted on either, wherein the pod may alternatively be utilized as a conventional bus operating on city streets to pick up or discharge passengers at designated stops, or as a monorail car, or as a VTOL aircraft for high-speed travel between suburban depots and metropolitan centers. Thus, the invention provides a single passenger-carrying pod having 3 modes of operation (i.e., as an air lift vehicle, using a helicopter or VTOL aircraft as the power unit; or as a bus, using an automotive type chassis; or as a monorail or other track-supported vehicle) and the capability of converting quickly and easily from any one mode to another.

One important object of the invention is to provide a light-weight passenger-carrying pod that is adapted to be carried by a helicopter or other VTOL aircraft, or alternatively, mounted on a separate, self-powered chassis for operation on the ground, and in which all of the necessary driving controls are presented in the usual locations at the driver's station inside the pod at the front end thereof when the pod is joined to the chassis, so that the composite vehicle can be driven by the operator from the driver's station. In one embodiment of the invention, the driving controls are contained within the pod, and means is provided for connecting them to their corresponding actuating mechanisms when the pod is joined to the chassis. In another embodiment of the invention, the driving controls are mounted in a recessed pan on the chassis, directly in front of the below the driver's seat, and these are accessible to the operator when seated in the driver's seat, through an opening in the floor of the pod. A retractable panel closes the opening when the pod is removed from the chassis. A steering column member on the chassis is extendable to meet a companionate steering column member in the pod which has the steering wheel attached thereto, and are joined together by a splined sleeve, or the like. A console carrying the speedometer, gages, electrical switches, and other control instruments is mounted on an extendable column on the chassis, and is extended up through the said opening into the pod, to a position in front of the driver and just below the windshield. The transmission control is also mounted on a pedestal that can be folded down into the recessed pan, or erected to an operating position alongside the operator. Thus, in both of the said embodiments, when the pod is joined to the wheeled chassis, the combination becomes, in effect, a conventional bus that can be operated on city streets in exactly the same manner as any other bus by the driver, who remains in the pod with the passengers at all times, where he is able to maintain control. On the other hand, when the pod is joined to the VTOL aircraft, the chassis with its heavy frame, wheels and tires, motor, transmission, and fuel supply or batteries, is left behind. Thus, the aircraft is not required to carry the heavy burden of the chassis, but instead transports only the lightweight pod with its payload of passengers or cargo.

Another object of the invention is to provide a rapid transit vehicle of the class described, wherein a passenger pod is disconnectably mounted on a self-powered, wheeled chassis, and in which the locking mechanism joining the pod to the chassis embodies an electrical interlock that prevents operation of the vehicle if all the connections have not been correctly made.

Still another object of the invention is to provide a rapid transit vehicle of the class described, wherein the passenger pod is disconnectably mounted on a self-powered chassis having wheels that run on a monorail track, so that the pod becomes a monorail car.

A further object of the invention is to provide a unit of the class described, in which the pod can be quickly and easily disconnected from the VTOL aircraft, and connected to the wheeled power unit, or vice versa, in a matter of three or four minutes, by the operator in charge of the passenger pod, without using special tools or equipment.

While the wheeled chassis, or power unit, of the invention might use any form of prime mover, such as a gasoline or diesel engine, one aspect of the invention has to do with the use of a battery-powered unit in which electric motors are connected to the drive wheels. The advantages of such an arrangement are two-fold: (1) the operating connections between the passenger pod and the power unit are simplified, in that most of the connections can be made with a simple plug and socket arrangement; and (2) a battery-powered vehicle produces no fumes, which is an important consideration at this time, when air pollution is becoming a major problem. Batteries have been developed recently that produce sufficient electrical power to make battery operation of a commuter bus practical, and one of the objects of the invention is to utilize such a battery-operated power unit with a passenger pod that is adapted to be carried on a VTOL aircraft.

DESCRIPTION OF THE DRAWINGS

FIG. 5 is a view similar to FIG. 3, showing another embodiment of the invention, wherein the wheeled chassis is powered by a diesel engine with automatic transmission or torque converter, instead of electric motors powered by batteries;

FIG. 6 is an enlarged fragmentary sectional view taken through the wheeled chassis just below the driver's station, showing the manner of connecting the driving controls to their corresponding actuating members, and also showing one of the locking devices for securing the pod to the chassis;

FIG. 7 is a schematic diagram, showing the electrical circuit connections for the embodiment depicted in FIG. 5;

FIG. 8 is an enlarged fragmentary view of a portion of one of the locking devices, the said device being cut away in part to show the electrical interlock whereby the entire system is deactivated until all of the interlocks have been properly connected;

FIG. 9 is a fragmentary, cut-away view of the front end portion of another embodiment of the invention, showing the driver's station;

FIG. 10 is a top plan view of the same;

FIG. 10 is a top plan view of the same;

FIG. 11 is an enlarged sectional view, taken at 11—11 in FIG. 10, showing how the controls on the chassis are extended up into the interior of the pod, or are otherwise presented in operative position to the operator seated in the driver's seat;

DESCRIPTION OF PREFERRED EMBODIMENTS

Figure 1:
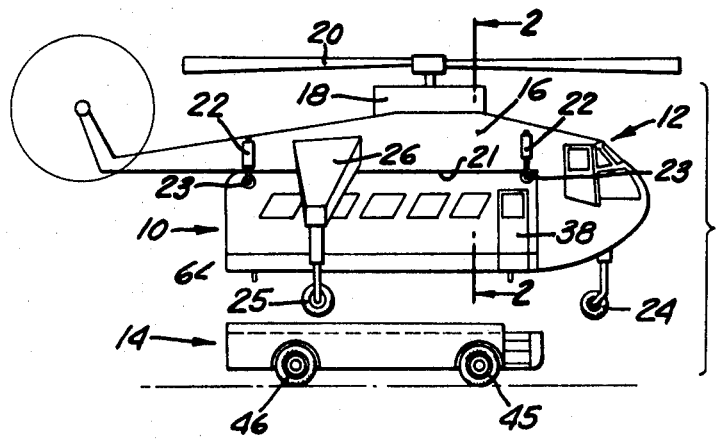
FIG. 1 is a side elevational view of the invention, showing the passenger pod mounted on a helicopter, which is hovering just above a power unit on the ground.
Figure 12:
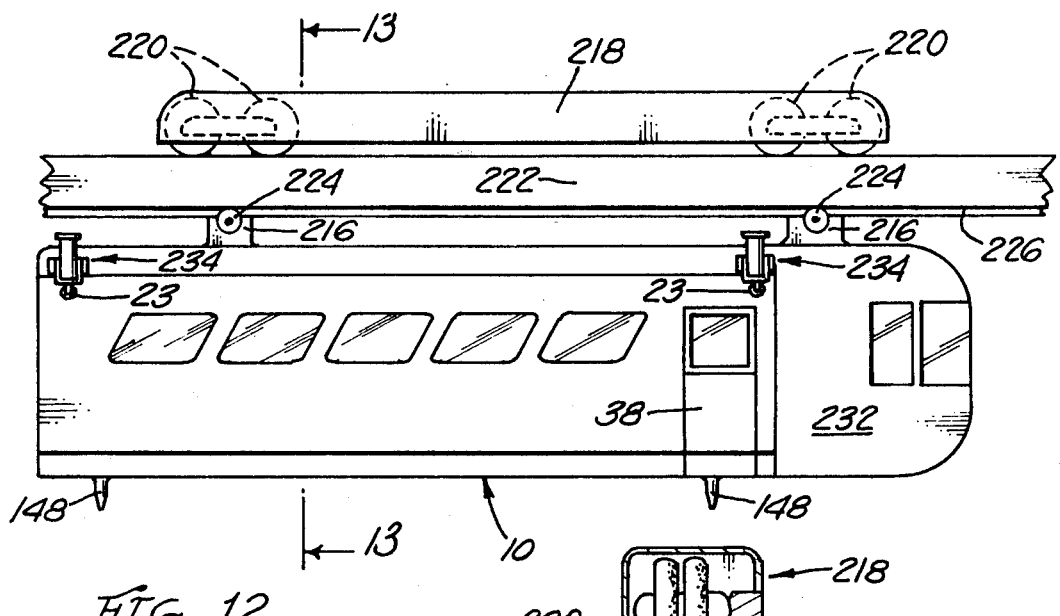
FIG. 12 is a side elevational view of a passenger pod mounted on a monorail chassis, or truck.
Figure 13:
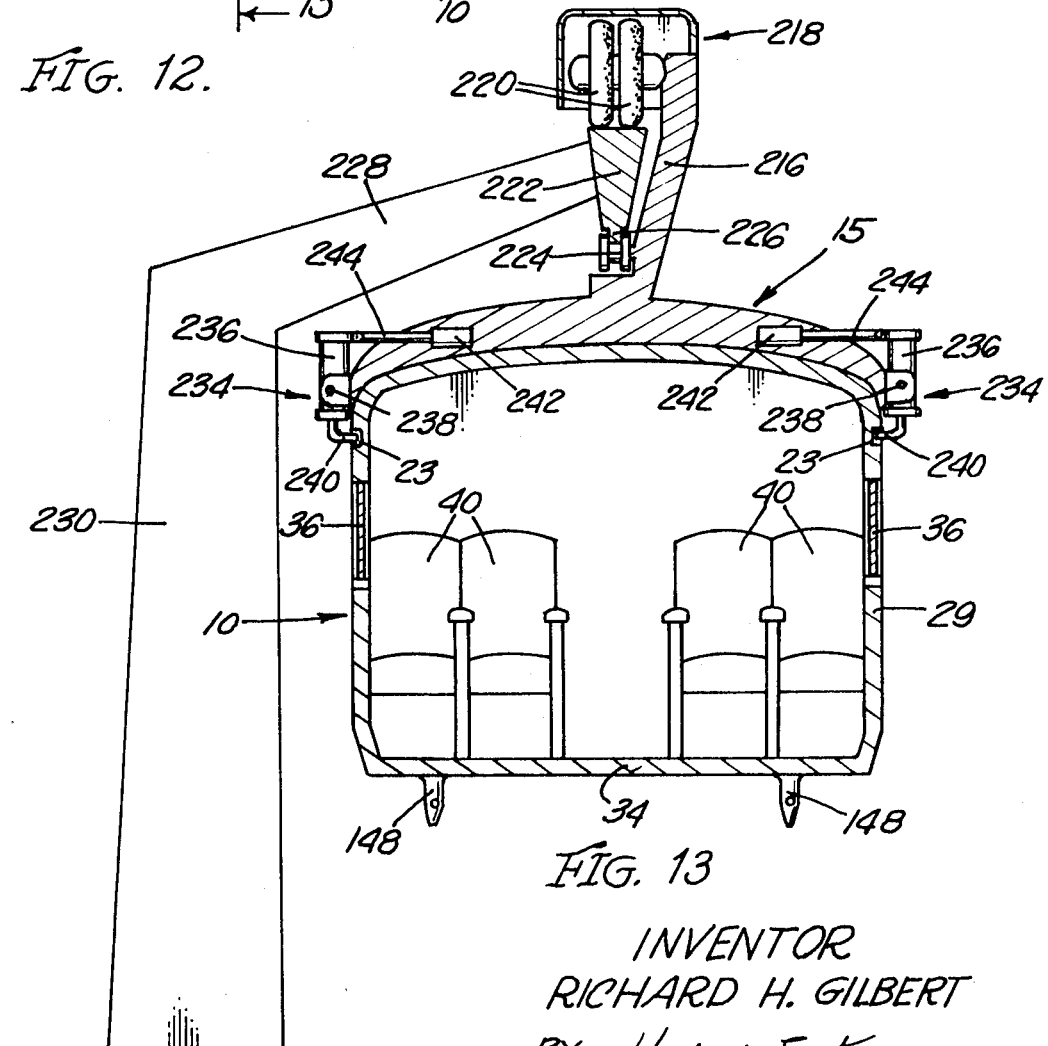
FIG. 13 is an enlarged sectional view through the same, taken at 13—13 in FIG. 12.

In the drawings, the invention is seen to comprise a passenger pod 10, which is adapted to be detachably secured to either a VTOL aircraft 12, or to a wheeled, automotive-type power unit 14, or to a monorail chassis 15 (FIGS. 12 and 13). The VTOL aircraft is preferably a helicopter of the type shown in the drawings, comprising a body 16, having a power plant 18 mounted on the top side thereof, which drives a rotor 20. The helicopter body is cut out at 21 on the underside thereof behind the pilot's compartment, to receive the passenger pod 10, as shown in FIG. 1. Four attachment devices 22 on the helicopter are adapted to engage lift points 23 on the four corners of the passenger pod near the top thereof, to secure the pod firmly to the helicopter. The attachment devices 22 may be of any type, and one concept of the invention is that such devices might include lifting cables, which permit the passenger pod to be lowered from the helicopter body onto the power unit 14, while the pod is shifted to one side or the other to align it exactly with the unit 14. The helicopter 12 also has a front wheel 24 and a pair of rear wheels 25, the latter being carried on laterally and downwardly projecting legs 26, which straddle the passenger pod 10.

Another concept of the invention is that the necessary relative vertical movement between the passenger pod 10 and power unit 14 in order to join them together might be accomplished by the use of air suspension units in the helicopter landing wheel legs, or on the wheels of the unit 14. In the former case, the air suspension units on the helicopter would lower the helicopter body with its attached pod, until the pod rests on the unit 14; while in the latter case, the air suspension units on the chassis 14 would first be actuated to lower the chassis several inches below its normal position until the helicopter has landed and has the pod positioned directly over the chassis, and then the air suspension units would be operated to raise the chassis until it engaged the pod. In either case, the attachment devices 22 would not be released until the full weight of the passenger pod was supported by the chassis. When the attachment devices 22 have been released, either the helicopter body would be raised a few inches, or the chassis 14 would be lowered a few inches, to provide the necessary clearance so as to allow the chassis with its attached pod to be driven out from under the helicopter.

Passenger pod 10 comprises a lightweight frame 28 upon which a body 29 is built. Body 29 is preferably of monocoque construction, utilizing honeycomb core panels which are extremely strong and lightweight. The lift points 23 on the four corners of the passenger pod may be connected by steel structural members (not shown) to the frame 28. The body 29 has sides 30, top 32, and floor 34. The sides 30 are provided with windows 36, and at the front end on the right-hand side thereof is a door 38. Pairs of seats 40 are arranged along the sides of the pod 10 on the interior thereof, and extending longitudinally of the pod between the pairs of seats is a central aisle 42.

The wheeled power unit 14 comprises a steel frame 44 designed to receive and support the pod 10. Mounted on the front end of the frame 44 are steerable wheels 45, and at the rear end are two pairs of dual wheels 46, which are connected to a prime mover on the frame. The prime mover may take the form of two electric motors 48 powered by batteries 50, as in FIGS. 3 and 4, or might be a diesel engine 52, driving the wheels through an automatic transmission, or torque converter 54, as in FIG. 5.

At the front end of the pod is a driver's station 56 with all of the usual driving controls, consisting of steering wheel 58, brake pedals 60, accelerator pedal 62, and electrical controls for turning the lights on or for operating other electrical mechanisms. These driving controls are adapted to be detachably connected to their operating mechanisms on the power unit 14. Thus, the steering mechanism for the front wheels 45 is adapted to be connected to the steering wheel 58, while the brake pedals 60 are operatively connected to a control device on the power unit 14 for actuating airbrakes on the wheels, and the accelerator pedal 62 is operatively connected to the prime mover on the unit 14, to regulate the speed of the electric motors 48 or the diesel engine 52.

The steering wheel 58 is mounted on a shaft 64, which is connected by a universal joint 66 or the like to a vertical shaft 68. Shaft 68 is supported at its lower end in a bearing 70, and projects downwardly beyond the bottom of the pod, terminating in a square (or hexagonal) end 72. The square end 72 of shaft 68 is adapted to be received with a correspondingly shaped socket 74, and the two are telescopically engaged when the pod is lowered on the power unit 14. This plug and socket arrangement is locked together by means of a locking ring 76, which is carried on the projecting bottom end of the shaft 68 and is engageable with laterally projecting ears, or pins (not shown), on the socket 76, in a well-known manner.

Socket 74 is formed integrally with a rotatable shaft 78, which projects upwardly from a power steering unit 80. Operating shafts 82 project laterally from opposite sides of the power steering unit 80, and these are connected by the usual linkage to the front wheels 45.

The other control connections are made by means of a multiprong electrical plug on the power unit 14, which is plugged into a socket 84 on the pod 10 at the time the hook-up is made. The plug 83 is plugged into its socket 84; locking ring 76 is secured; and an electrical interlock connection (which will be described shortly) is made by the operator, working through an access door 84', which is hinged at 86 to the front end of chassis 14.

Brake pedal 60 is preferably connected to the angularly movable contact arm 88 of a rheostat 90 (see FIG. 7), the resistance element 92 of which is connected by a wire 94 to one of the contacts in the socket 84. In like manner, accelerator pedal 62 is connected to the angularly movable contact arm 96 of a rheostat 98, the resistance element 100 of which is connected by a wire 102 to another contact in the socket 84.

In the case of chassis 14 powered by an internal combustion gasoline engine, there would also be an ignition switch 104 on the pod, which is connected by a wire 106 to one of the contacts in the socket 84, and a starter switch 108, which is connected by a wire 110 to another contact in the socket 84. Where the chassis is powered by a diesel engine, there would of course be no ignition switch 104, since the diesel engine has no ignition system.

If chassis 14 has an automatic transmission, the speed selector control would consist of a selector switch 112, which can be shifted to one or another of 3 (more or less) contacts 114, 115 and 116. Each of the contacts 114, 115 and 116 is connected by its own wire to a corresponding contact in the socket 84. Where a torque converter is used, it is not necessary to shift a speed selector, and switch 112 could be omitted.

Figures 2, 4:
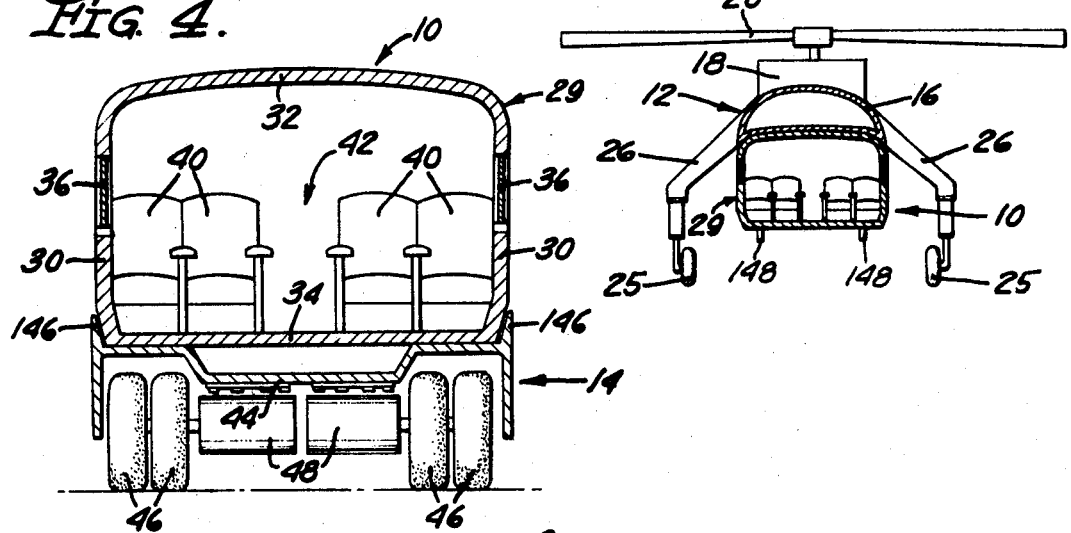
FIG. 2 is a sectional view through the helicopter and pod, taken at 2—2 in FIG. 1.
FIG. 4 is a transverse vertical section through the passenger pod and power unit, taken at 4—4 in FIG. 3.
Figure 3:
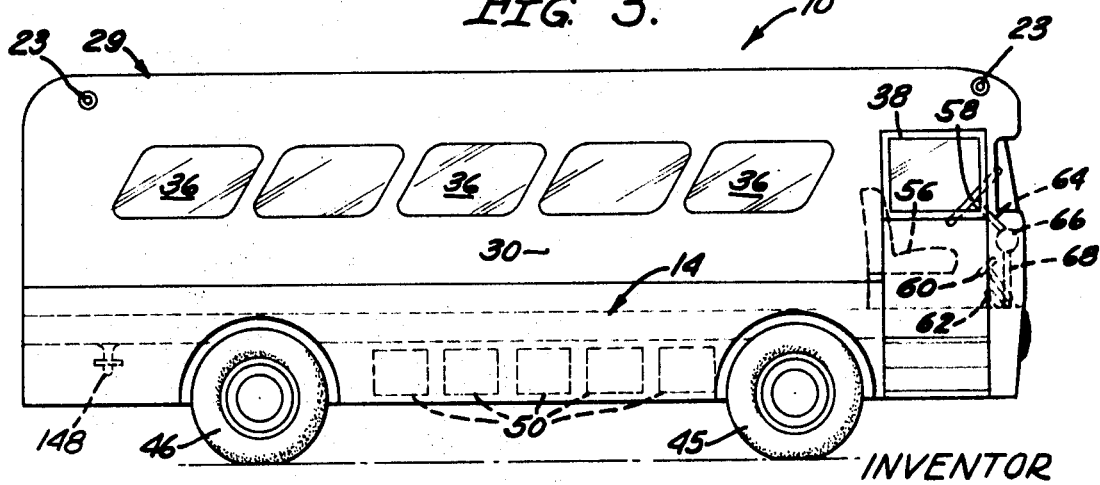
FIG. 3 is an enlarged side elevational view, showing the passenger pod mounted on the power unit.

In the case of the battery-powered, electric-motor-driven unit of FIGS. 3 and 4, the ignition switch 104, starter switch 108, and speed selector switch 112 would all be eliminated, and the accelerator and rheostat 98 would be connected to the armatures of the motors 48.

Mounted on the chassis 14 is a battery 114, which may be the same batteries as those designated at 50 in FIG. 4 or a more conventional battery such as the type used in ordinary internal combustion engine powered busses. Battery 114 is connected at one terminal to the ground 116, while the other terminal is joined by a wire 118 having four series-connected interlock switches 119 connected thereto, to one of the prongs on the plug 83. The said prong closes with a corresponding contact in the socket 84, which is connected to a "hot" wire 120 on the pod, and when the plug 83 is joined to the socket 84, current is transmitted from the battery 114 to wire 120, as well as from the several control switches on the pod back to their corresponding mechanisms on the chassis 14. The hot wire 120 is connected to switches 104, 108 and 112, and also to rheostats 90 and 98, as shown in FIG. 7. Also connected to hot wire 120 are light switches 121 and 122. Switch 121 closes the circuit to driving lights 124 on the pod; and switch 122 controls the interior lights 126.

The prongs of plug 83 are connected by suitable wires to the appropriate operating mechanisms in the chassis 14. For example, contact 114 of selector switch 112 is connected to solenoid 128, which causes one of the speed ranges of the automatic transmission to be engaged when the switch is closed to that contact. In like manner, contact 115 is connected to another solenoid 130 on the automatic transmission 54; while contact 116 is connected to a third solenoid 132. Thus, one or another of the three solenoids 128, 130, 132, will be energized, depending upon which of the contacts 114, 115, 116 is closed to switch 112, and whichever solenoid is energized will determine the speed range of the transmission 54.

Resistance element 92 of brake rheostat 90 is connected to a solenoid 134, which actuates the power brakes unit 136 of the chassis. The more brake pedal 60 is depressed, the more current is passed through rheostot 90 to solenoid 134, and the more the brakes will be applied.

Resistance element 100 of accelerator rheostat 98 is connected to a solenoid 138, which actuates the engine accelerator 140. Accelerator 140 may be nothing more than a linkage connection between the armature of the solenoid 138 and the engine throttle linkage (or fuel injection metering device), or it may be a more complicated mechanical device.

Ignition system 142 (which would only be used with a gasoline-powered engine) is connected to the ignition switch 104; while starter relay 144 is connected to starter switch 108.

There are several different power-plant arrangements contemplated within the scope of the invention—e.g., gasoline engine with automatic transmission or torque converter; diesel engine with automatic transmission or torque converter; or battery-powered electric motor— each of which has certain advantages and disadvantages, and all of which might be utilized within a single large municipal transit system. Therefore, the preferred arrangement would be to utilize the same connecting plug 83 and socket 84 on all passenger pods and chassis units, the only difference being that those connectors which are not used for any given combination of pod and chassis would be dead. In this way, any pod 10 would be used with any chassis 14 having either form of power plant or transmission.

As best shown in FIG. 4, the chassis 14 has an upwardly projecting flange 146 around the sides thereof, the inner surface of which is flared outwardly to guide the bottom edge of the passenger pod down into place. The passenger pod is correspondingly tapered on its lower edges, and when the pod is fully seated on the chassis, it fits snugly between the flanges 146. The pod is adapted to be securely locked to the frame 44 of the chassis 14 by means of a plurality of locking members 148, which project downwardly from the underside of the passenger pod near the four corners thereof, and which pass through openings 150 in the frame 44 of the chassis (see FIG. 6). The locking members 148 are preferably in the form of solid steel bars, the bottom ends of which are tapered at 152 to help guide them into place. The members 148 pass downwardly between two laterally spaced side members 154, 155, which are fixed to the underside of the chassis frame 44. The members 154, 155 converge downwardly for about the upper one-fourth of their length, and then become parallel to one another for the remainder of the distance; the space between their parallel sides being only slightly greater than the width of the member 148, so that the latter fits snugly between them. Slidably received within aligned holes in the side members 154, 155, and locking member 148, is a shear pin 156, which locks member 148 to members 154, 155, and thereby locks the pod 10 to the chassis 14. Shear pin 156 may be formed integrally with the piston rod of an air cylinder 158, which is actuated by a manually controlled valve 160. When valve 160 is operated in one direction, shear pin 156 is extended to the left as viewed in FIG. 6, and is pushed through the aligned openings in members 148, 154 and 155. Operating the valve in the other direction causes the shear pin to be retracted, so that the locking member 148 can be withdrawn from between members 154, 155.

Shear pin 156 has a transverse bore formed therein, and inserted down through this bore from above is an interlock switch pin 164 of plastic or other electrically non-conducting material. The pin 164 has two longitudinally spaced copper rings 166 and 167 provided on that portion of its surface which is confined within the bore 162, and these rings contact the inner surface of the bore when the pin is seated. The rings 166, 167 are connected to wires 118, which form a part of the circuit shown on FIG. 7, and each of the interlock pins 104, with its copper rings 166 and 167, forms a normally-open switch 119, which is closed when the pin is inserted into the bore 162, and the circuit is closed by member 156. The four switches 119 are connected together in series, as shown in FIG. 7, and if any one of these should be left out, the entire electrical circuit is open, and the power unit 14 cannot be operated. However, when all four interlock pins 164 are properly seated in their bores 162, the electrical circuit is closed (provided plug 83 is inserted into socket 84) and the vehicle can thus be operated in the normal manner.

Another form of the invention is shown in FIGS. 9, 10 and 11, to which attention is now directed. In this embodiment of the invention, parts which are similar in function to those of the preceding embodiment have the same reference numerals as the latter, with the prime (′) suffix added. Passenger pod 10′ is generally similar to pod 10, and is adapted to be carried by a helicopter or other VTOL aircraft, or mounted on a wheeled power unit 14′. The chief difference between this embodiment and the one previously described is in the arrangement of the driving controls, and the manner whereby they are made operative when the pod is mounted on the power unit.

The power unit (or chassis) 14′ is a two-axle unit having steerable front wheels, and a gasoline or diesel engine (not shown) mounted on its frame midway between the wheels, similar to the arrangement shown in FIG. 5. Power is transmitted from the engine to the rear wheels through the usual transmission and differential. Also mounted on the chassis 14′ is an air-conditioning unit (not shown) with adequate capacity to maintain the interior temperature of the pod between 66° F. and 72° F. during all ground operations.

The forward end of chassis 14′ contains the controls for steering and braking, speed control, automatic transmission, and electrically-operated equipment such as headlights, turn indicators, and horn. Functionally, these controls are conventional in nature, and operate identically to the controls in standard automobiles and busses. The controls consist of an accelerator pedal 170, brake pedal 172, and steering wheel 174 mounted on the top end of an upper steering wheel column 176. The upper column 176 is detachably connected to a lower steering wheel column 178, at its bottom end, by means of a sliding, splined sleeve 180. Lower column 178 is connected to the wheel-steering mechanism on the chassis, and when upper column 176 is attached to it by the splined sleeve 180, the front wheels of the chassis can be turned with the steering wheel 174. Upper steering column 178 is rotatably held in position within the pod 10′ by means of a collar 182, which is attached to bracing struts 183 and 184.

When the pod 10′ is separated from the chassis 14′, the latter is relatively "clean" and unobstructed at the plane of separation. The instrument console 194 is completely retracted down into the well 186; the lower steering wheel column 178 terminates below the plane of separation; and the pedestal 204 carrying the transmission control lever 202 is folded down forwardly and lies flat on the floor of the well. In the pod, the opening 190 is closed by panel 192, and the steps 206 are retracted.

In the preferred form of the invention, the chassis 14′ is provided with air suspension units (not shown) on all four wheels, and these can be extended to raise the chassis, or retracted to lower it. The purpose of raising and lowering the chassis is to enable it to pick up and drive the pod out from under the helicopter without interfering with any of the structure of the latter. If necessary, the chassis 14′ can be lowered from its normal driving level prior to landing of the helicopter, then raised to pick up the pod, and finally lowered to provide clearance. If the pod is carried high enough off the ground to make it unnecessary for the chassis to be lowered first, the chassis can be raised from its normal position to pick up the pod, and then lowered back to normal position.

At the time the pod is locked to the chassis, the panel 192 is slid back, opening the recessed well 186. The splined sleeve 180 is pushed down over the top of the lower steering wheel column 178, thereby locking columns 176 and 178 together so that they rotate as one. The telescoping post 198 is then extended, raising the console 194 up into the pod, and pedestal 204 is swung up to the vertical position. All of the driving controls are now presented in the usual arrangement and position to the operator seated in the driver's seat, and the vehicle can be driven in exactly the same manner as any conventional bus.

FIGS. 12 and 13 show the passenger-carrying pod 10 mounted on a monorail chassis 15. The chassis 15 is suspended by arms 216 from an overhead truck 218 having a plurality of pneumatic-tired wheels 220 that run on a track 222. Stabilizer wheels 224 engage a flange 226 on the underside of the track 222 to keep the car from swaying sideways. The track 222 is supported by cantilever arms 228 projecting laterally from the top ends of pylons 230. The pheels 220 are arranged in pairs, side-by-side, and are connected through a suitable transmission to a motor (not shown) which is carried by the truck 218.

The chassis 15 is an elongated, relatively shallow structure that is shaped to receive and conform to the top of the pod 10. At the front end of the chassis 15 is a cab 232, in which the driver rides. In the embodiment shown in FIGS. 12 and 13, the controls for operating the motor and brakes are located in the cab 232. However, it is also contemplated that the monorail control mechanisms might be disconnectably coupled to the operating controls at the driver's station in the pod 10, in which case the operator riding in the pod could drive the monorail car without leaving his station.

Mounted on the chassis 15 in position to engage the lift points 23 at the four corners of the passenger pod are attachment devices 234. The attachment devices 234 are essentially the same as the corresponding devices 22 on helicopter 12, and are shown more or less schematically. For purposes of illustration, such devices might consist of hydraulic cylinders 236 pivoted at 238, and having laterally inwardly projecting gripping fingers 240 at the ends of their piston rods, which hook onto the lift points 23 to secure the pod to the chassis. Cylinders 242 are connected by links 244 to the top ends of lift cylinders 236, and these serve to rock the latter about the pivots 238 when the pod is being connected to or disconnected from the chassis 15. Any other suitable attachment device might be used for securing the pod to the chassis 15.

Instead of only one pod attached to a chassis 15 to form a single monorail car as in the drawings, there might be several monorail cars made up of pods and chassis coupled together in tandem to form a train. In that case, only the monorail truck 218 at the front end would have to be powered, and the others could be simple, wheel-supported trucks.

At this time, it is contemplated that an efficient air-bus or monorail-bus transit system might use three types of pod 10; (1) an all-passenger pod having a capacity of 40 passengers, more or less; (2) a combined passenger-and-cargo pod having a capacity of approximately 16 passengers and about 4000 lbs. of cargo, particularly for carrying mail or fast express between rush hours; and (3) an all-cargo pod. Under normal operating conditions, one helicopter or one monorail truck would be required for about 18 pods and chassis units, since the pods would spend considerably more of their time operating on city streets than in being transported by helicopter or monorail. Because of the greater travel speed and freedom from traffic congestion, it is estimated that one helicopter-pod or one monorail truck-pod combination would have the passenger transporting capacity of five conventional busses.

While I have shown and described a passenger pod having integral pick-up points 23 which are engaged by the attachment devices 22 on the helicopter or monorail truck it is also contemplated that the pod might be cradled within a cage that is integral with the structural framework of the helicopter or monorail truck, or suspended therefrom. It is also contemplated that the helicopter would land its pod a short distance from the chassis 14, and the chassis then rolled forwardly under the pod, or the helicopter rolled backwardly over the chassis, so that the pod could be lowered into place on the chassis.

The invention is not to be construed as limited to the specific form shown and described herein, but may take various other forms within the scope of the following claims.

I claim:

1. A rapid transit commuter vehicle comprising a passenger pod adapted for detachable connection with a VTOL aircraft to be carried thereby, said passenger pod having seats for passengers and a driver's station;
   said driver's station having operating control for steering, regulating the running speed, and actuating brakes, when running on the ground;
   a chassis having at least two pairs of ground wheels at the front and rear ends thereof, said wheels having brakes and at least one of said pairs of wheels being steerable;
   driving means connected to at least one of said pairs of wheels;
   means for connecting said pod to said chassis so that they become as one; and
   separable means connecting said driving controls in said pod to their corresponding parts on said chassis, whereby the driver is enabled to steer, control speed, and operate the brakes when said pod is mounted on said chassis.

2. A rapid transit commuter vehicle, as described in claim 1, wherein said driving means comprises at least one electric motor connected to at least one of said pairs of wheels on said chassis;
   and a set of batteries carried by said chassis to supply electric current to said motor.

3. A rapid transit commuter vehicle, as described in claim 1, wherein said means for connecting said pod to said chassis includes electrical interlock means operably connected with said driving controls, whereby the latter are rendered inoperable when said connecting means is incompletely joined together.

4. A rapid transit vehicle, as described in claim 1, wherein said operating controls include a steering wheel connected to a downwardly projecting vertical shaft;
   a steering mechanism on said chassis operatively connected to said steerable wheels to steer the same, said steering mechanism having an upwardly projecting actuating member which is axially aligned with said shaft when said pod is carried on said chassis; and
   means for joining said shaft and said actuating member together so that they turn as one, whereby said steering mechanism is actuated to steer said wheels in the appropriate direction when said steering wheel is turned.

5. A rapid transit vehicle, as described in claim 1, wherein there is a source of electrical ccurrent on said chassis;
   electrical operating mechanisms on said chassis for actuating the brakes and for regulating the speed of said driving means;
   said driving controls being operable to actuate said electrical operating mechanisms when connected thereto; and
   separable means for electrically connecting said driving controls and said source of electrical current to said operating mechanisms.

6. A rapid transit vehicle, as described in claim 1, wherein said driving means includes an internal combustion engine and associated transmission means;
   an electrical operating mechanism on said chassis for regulating the running speed of said engine;
   said driving controls including an accelerator pedal operable to actuate said mechanism when connected thereto; and
   separable means for electrically connecting said accelerator pedal to said operating mechanism, whereby the speed of said engine is regulated by depressing or letting up on said pedal.

7. A rapid transit commuter vehicle comprising a passenger pod adapted for detachable connection with a VTOL aircraft to be carried thereby, said passenger pod having seats for passengers and a driver's station;
- a chassis having at least two pairs of ground wheels at the front and rear thereof, said wheels having brakes, and at least one of said pairs of wheels being steerable;
- driving means connected to at least one of said pairs of wheels;
- means for connecting said pod to said chassis so that they become as one;
- operating controls for steering said steerable wheels, regulating the running speed of the vehicle, and actuating said brakes when running on the ground; and
- said operating controls being connected to their respective actuating mechanisms on the chassis when the pod is mounted on the chassis, and being presented in the usual arrangement and placement with respect to the operator when the latter is seated at said driver's station, whereby the operator is enabled to steer, control speed, and operate the brakes from the driver's station within the pod when the pod is mounted on said chassis.

8. A rapid transit commuter vehicle, as set forth in claim 7, wherein said operating controls include a steering mechanism, brake pedal, accelerator pedal, and transmission control, mounted on said chassis;
- a steering wheel mounted within said pod directly ahead of said driver's station;
- means for detachably connecting said steering wheel to said steering mechanism on said chassis;
- an opening in the bottom of said rod directly ahead of said driver's station;
- a closure panel for closing said opening when said pod is removed from said chassis;
- said brake pedal, accelerator pedal, and transmission control being accessible through said opening to an operator seated at the driver's station.

9. A rapid transit commuter vehicle as in claim 8, wherein said brake pedal, said accelerator pedal, and said transmission control are mounted in a recessed well in the top surface of said chassis at the front end thereof, said well being located directly under said opening when said pod is mounted on said chassis;
- said steering wheel being mounted on the top end of an upper steering wheel mechanism, and said steering mechanism of said chassis being operatively connected to a lower steering wheel column disposed within said recessed well, said column being axially aligned when said pod is mounted on said chassis;
- means for connecting said upper and lower steering wheel columns together so that they rotate as one; and
- said transmission control being movable between an erect operating position within convenient reach of the operator seated at said driver's station, and an inoperative position retracted into said recessed well.

10. A rapid transit commuter vehicle, as in claim 9, which additionally includes an instrument console carried on an extendible post mounted on said chassis within the confines of said recessed well;
- said console being retracted down into said well when said pod is disconnected from said chassis, and said post being extended vertically when said pod is mounted on said chassis so as to elevate said console through said opening and up into said pod to a position in front of the operator seated at said driver's station; and
- and console carrying instruments connected to associated sensing or measuring devices on said chassis, and electrical switches connected to associated electrical circuits on said chassis.

11. A rapid transit commuter vehicle comprising a lightweight passenger pod adapted for detachable connection with either of two powered units to form, in combination with said units, two different types of self-propelled vehicles, said passenger pod having seats for passengers and a driver's station;
- each of said powered units comprising a chassis adapted to receive said pod;
- each of said chassis having its own power plant and means operated by said power plant for propelling the chassis; and
- attachment means for connecting said pod to either of said chassis so that they become as one.

12. A rapid transit commuter vehicle as in claim 11, wherein at least one of said powered units comprises a chassis mounted on a truck having wheels that run on an overhead monorail.

13. A rapid transit commuter vehicle as in claim 11, wherein at least one of said powered units comprises an automotive chassis having wheels that run on the ground; one set of wheels being steerable and said chassis having transmission means, accelerator, brakes, and driving lights; and control means positioned within said pod at said driver's station when the pod is mounted on said one chassis; whereby the driver is able to drive said pod and chassis combination on the ground in the manner of a bus.

14. A rapid transit commuter vehicle as in claim 13 wherein the other of said powered units comprises a chassis mounted on a truck having wheels that run on an overhead monorail, whereby the pod and said other power unit combination can be operated as a monorail car.

References Cited

UNITED STATES PATENTS

| | | | |
|---|---|---|---|
| 2,998,948 | 9/1961 | Sisk | 244—137 |
| 3,088,537 | 5/1963 | Le Tourneau | 180—77 |
| 3,176,940 | 4/1965 | Echeverria | 244—118 |
| 3,289,981 | 12/1966 | Meyer | 244—137 |
| 3,361,396 | 1/1968 | Reno | 244—118 |
| 3,483,829 | 12/1969 | Barry | 104—18 |

FOREIGN PATENTS

| | | | |
|---|---|---|---|
| 559,763 | 3/1944 | Great Britain | 244—118 |

KENNETH H. BETTS, Primary Examiner

U.S. Cl. X.R.

180—65, 90; 296—35A; 244—118; 104—20, 118